United States Patent
Papakonstantopoulos et al.

(10) Patent No.: US 12,104,038 B2
(45) Date of Patent: Oct. 1, 2024

(54) SILICA REINFORCED RUBBER

(71) Applicant: THE GOODYEAR TIRE & RUBBER COMPANY, Akron, OH (US)

(72) Inventors: George Jim Papakonstantopoulos, Medina, OH (US); Brad Stephen Gulas, Fairlawn, OH (US); Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 14 days.

(21) Appl. No.: 17/546,256

(22) Filed: Dec. 9, 2021

(65) Prior Publication Data

US 2022/0204722 A1 Jun. 30, 2022

Related U.S. Application Data (60) Provisional application No. 63/154,272, filed on Feb. 26, 2021, provisional application No. 63/131,842, filed on Dec. 30, 2020.

(51) Int. Cl.
*C08K 3/06* (2006.01)
*B60C 1/00* (2006.01)
(Continued)

(52) U.S. Cl.
CPC .............. *C08K 3/06* (2013.01); *B60C 1/0016* (2013.01); *C08K 3/36* (2013.01); *C08K 5/5403* (2013.01);
(Continued)

(58) Field of Classification Search
CPC .......... C08K 3/06; C08K 3/36; C08K 5/5403; C08K 5/548; C08K 9/06; C08K 3/04;
(Continued)

(56) References Cited

U.S. PATENT DOCUMENTS 3,842,111 A  10/1974 Meyer Simon et al.
3,873,489 A   3/1975 Thurn et al.
(Continued)

FOREIGN PATENT DOCUMENTS

CA   2530346 A1   6/2006
EP   2003137 B1   10/2015
(Continued)

OTHER PUBLICATIONS

Extended European Search Report dated May 9, 2022 for European Patent Application No. EP21212826.8 which is the European counterpart to the subject patent application.

*Primary Examiner* — Doris L Lee
(74) *Attorney, Agent, or Firm* — Alvin T. Rockhill (57) ABSTRACT

The subject invention is based upon the unexpected discovery that the use of a very specific combination of hydrophobating silanes and sulfur crosslinkable silanes can be used to attain outstanding performance characteristics in silica reinforced rubber formulations. More specifically, these rubber formulations provide a highly desirable combination of both improved abrasion characteristics and reduced hysteresis without compromising other important rubber characteristics. The present invention more specifically discloses a sulfur cured rubber formulation which is the reaction product of (1) at least one rubbery polymer, (2) sulfur, (3) silica, (4) 2 phf to 12 phf of a hydrophobating silane, and (5) 0.5 phf to 3 phf of a crosslinkable silane. The weight ratio of the hydrophobating silane to the crosslinkable silane will typically be within the range of about 2:1 to about 20:1.

20 Claims, 4 Drawing Sheets

(51) Int. Cl.
  *C08K 3/36* (2006.01)
  *C08K 5/54* (2006.01)
  *C08K 5/548* (2006.01)
  *C08K 9/06* (2006.01)
  *C08L 9/06* (2006.01)

(52) U.S. Cl.
  CPC .............. *C08K 5/548* (2013.01); *C08K 9/06* (2013.01); *C08L 9/06* (2013.01)

(58) Field of Classification Search
  CPC .......... C08K 5/09; C08K 5/5419; C08K 3/22; C08K 5/31; C08K 5/47; B60C 1/0016; C08L 9/06; C08L 15/00; C08L 9/00; C08L 91/00; C08L 25/16; C08L 91/06
  See application file for complete search history.

(56) References Cited

U.S. PATENT DOCUMENTS

| | | | |
|---|---|---|---|
| 3,978,103 A | 8/1976 | Meyer Simon et al. | |
| 5,405,985 A | 4/1995 | Parker et al. | |
| 5,468,893 A | 11/1995 | Parker | |
| 5,663,396 A | 2/1997 | Musleve et al. | |
| 6,172,251 B1 | 1/2001 | Parker | |
| 6,262,178 B1* | 7/2001 | Sandstrom | C08L 7/00 525/239 |
| 6,294,683 B1 | 9/2001 | Johnson | |
| 7,585,481 B2 | 9/2009 | Dodson | |
| 7,687,107 B2 | 3/2010 | Okel et al. | |
| 7,704,552 B2 | 4/2010 | Okel et al. | |
| 7,767,742 B2 | 8/2010 | Krafczyk et al. | |
| 2002/0081247 A1 | 6/2002 | Dodson | |
| 2005/0009955 A1* | 1/2005 | Cohen | C07F 7/1804 524/492 |
| 2005/0176852 A1* | 8/2005 | Okel | B82Y 30/00 106/482 |
| 2007/0078202 A1* | 4/2007 | Mihara | C09C 1/3081 428/405 |
| 2012/0277361 A1* | 11/2012 | Yoo | B32B 5/16 524/262 |
| 2017/0247532 A1* | 8/2017 | Miller | C08L 9/00 |

FOREIGN PATENT DOCUMENTS

| | | | |
|---|---|---|---|
| WO | 0231034 A2 | | 4/2002 |
| WO | WO 2006/076670 | * | 7/2006 |

* cited by examiner

SILICA REINFORCED RUBBER

This application claims benefit of U.S. Provisional Patent Application Ser. No. 63/131,842, filed on Dec. 30, 2020 and to U.S. Provisional Patent Application Ser. No. 63/154,272 filed on Feb. 26, 2021. The teachings of U.S. Provisional Patent Application Ser. No. 63/131,842 and U.S. Provisional Patent Application Ser. No. 63/154,272 are incorporated herein by reference in their entirety.

BACKGROUND OF THE INVENTION

Typically one or more fillers, such as carbon black or silica, are included in rubber formulations to attain desired physical properties. For instance, the rubber compositions used in tires, hoses, power transmission belts, conveyor belts, and a wide variety of other rubber products, normally contain one or more fillers. Carbon black has traditionally been used as a reinforcing-filler in manufacturing such rubber products. However, there is a growing trend toward utilizing silica or a combination of silica and carbon black in rubber formulations, such as tire tread formulations, to attain improved physical properties, such as wet traction characteristics and tread life without sacrificing rolling resistance (fuel economy).

A silica coupling agent is normally employed in rubber compounds that utilize silica as a filler in order to attain better compatibility with the rubber and to attain more optimal physical characteristics. Hydrophobating silanes and sulfur containing crosslinkable silanes can be beneficially used as the silica coupling agent. For instance, various sulfur containing organosilicon compounds are useful as reactive silica coupling agents. A wide variety of hydrophobating silane compounds can also be beneficially employed. In any case, the use of such organosilicon compounds in silica containing rubbers improves physical properties by coupling the silica filler to the rubber.

U.S. Pat. Nos. 3,842,111, 3,873,489 and 3,978,103 disclose the preparation of various sulfur containing organosilicon compounds. These organosilicon compounds are prepared by reacting (1) 2 moles of a compound of the formula Z-Alk-X, wherein X is a halogen selected from the group consisting of chlorine, bromine or iodine; wherein Z represents:

wherein $R^1$ is an alkyl group containing from 1 to 4 carbon atoms or a phenyl group and wherein $R^2$ is an alkoxy group containing from 1 to 8 carbon atoms, a cycloalkoxy group containing from 5 to 8 carbon atoms or an alkylmercapto group containing from 1 to 8 carbon atoms, wherein Alk is a divalent aliphatic hydrocarbon, an unsaturated hydrocarbon or a cyclic hydrocarbon containing 1 to 18 carbon atoms; with (2) 1 mole of a compound of the formula $M_2S_n$, wherein M is an ammonium group or a metal atom and n is a whole number from 2 to 6. Since the two starting materials are liquid, the reaction can take place in the absence of a solvent; however, the utilization of a volatile inert organic solvent is preferred and accordingly such an inert organic solvent is generally used. The reaction is carried out with the exclusion of water. The reason for the exclusion of water is to avoid the alkaline hydrolysis reaction of the silyl alkoxy groups which will ultimately lead to insoluble polymeric by-products and lower the overall yield of desired product. Aliphatic alcohols, such as methanol, ethanol, iso-propyl alcohol, normal-propyl alcohol, n-butanol, iso-butanol and t-butyl alcohol are representative examples of suitable inert organic solvents. At the end of the reaction between the two starting materials, the separated salt is removed by filtration. The filtrate is then freed from the solvent by distillation under vacuum. Unfortunately, this process is difficult to carry out on a commercial basis for a variety of reasons. For instance, most alcohols that are suitable for utilization as the solvent are difficult to obtain and maintain in a water-free (anhydrous) state. Additionally, most suitable alcohols, such as ethyl alcohol, have a low flash point which is highly undesirable in commercial applications.

U.S. Pat. No. 5,405,985 relates to a process for the production of organosilicon compounds of the formula: Z-Alk-Sn-Alk-Z. wherein Z is selected from the group consisting of wherein $R^1$ is an alkyl group of 1 to 4 carbon atoms, a cyclohexyl group, or a phenyl group; wherein $R^2$ is an alkoxy group containing from 1 to 8 carbon atoms or cycloalkoxy containing from 5 to 8 carbon atoms; wherein Alk represents a divalent hydrocarbon of 1 to 18 carbon atoms, and wherein n is an integer of 2 to 8; comprising reacting (A) a compound of the formula: Z-Alk-X, wherein X represents Cl, Br or I; with (B) a compound of the formula: $Me_2S_n$, wherein where Me is an ammonium ion or an alkali metal ion; and wherein the reaction is conducted in the presence of a phase transfer catalyst and an aqueous phase.

U.S. Pat. No. 5,468,893 relates to a process for the production of organosilicon compounds of the formula: Z-Alk-Sn-Alk-Z. wherein Z is selected from the group consisting of:

wherein $R^1$ is an alkyl group containing 1 to 4 carbon atoms, a cyclohexyl group, or a phenyl group; wherein $R^2$ is an alkoxy group containing from 1 to 8 carbon atoms or cycloalkoxy group containing from 5 to 8 carbon atoms; wherein Alk is a divalent hydrocarbon containing from 1 to 18 carbon atoms, and n is an integer of 2 to 8; comprising reacting (A) a compound of the formula Z-Alk-X, wherein X is Cl, Br or I; with (B) a compound of the formula $Me_2S_n$, wherein Me is ammonium or an alkali metal; and wherein the reaction is conducted in the presence of a phase transfer catalyst, an aqueous phase and a salt of the formula: XY or $X_2SO_4$, wherein X is selected from the group consisting of Li, Na, K, Rb and Cs; and wherein Y is selected from the group consisting of F, Cl and Br.

U.S. Pat. No. 5,663,396 discloses a process for the production of organosilicon compounds of the formula relates to a process for the production of organosilicon compounds of the formula: Z-Alk-Sn-Alk-Z. wherein Z is selected from the group consisting of:

wherein $R^1$ is an alkyl group containing 1 to 4 carbon atoms, a cyclohexyl group, or a phenyl group; wherein $R^2$ is an alkoxy group containing from 1 to 8 carbon atoms or cycloalkoxy group containing from 5 to 8 carbon atoms; wherein Alk is a divalent hydrocarbon containing from 1 to 18 carbon atoms, and n is an integer of 2 to 8; comprising (A) reacting sodium hydroxide with sulfur in the presence of a saturated NaCl aqueous solution to form a reaction mixture; and (B) reacting said reaction mixture with a compound of the formula: Z-Alk-X, wherein X is Cl or Br, in the presence of a phase transfer catalyst.

U.S. Pat. Nos. 6,172,251 and 6,294,683 disclose a technique for reacting a first liquid chemical compound with a second liquid chemical compound which comprises (1) supporting the first liquid chemical compound on a solid support; (2) subsequently bringing the solid support into contact with the second liquid chemical compound; and (3) allowing the first chemical compound to react with the second chemical compound in the presence of a phase transfer catalyst to produce a reaction product. This technique is particularly useful in the synthesis of sulfur containing organosilicon compounds of the formula Z-Alk-$S_n$-Alk-Z, wherein Z is selected from the group consisting of wherein $R^1$ is an alkyl group of 1 to 4 carbon atoms, cyclohexyl or phenyl; wherein $R^2$ is alkoxy group of 1 to 8 carbon atoms, cycloalkoxy group of 5 to 8 carbon atoms or an alkylmercapto group of 1 to 8 carbon atoms; wherein Alk is a divalent hydrocarbon of 1 to 18 carbon atoms; and wherein n is an integer of 2 to 8. It is indicated that such sulfur containing organosilicon compounds can be made by reacting aqueous solutions of various polysulfidic anions in saturated sodium chloride brine solutions with chloropropyltriethoxysilane (CPTES) supported on carbon black in the presence of a phase transfer catalyst.

Rubber formulations which include silica and a silica coupling agent will typically be mixed utilizing a thermomechanical mixing technique. More specifically, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The functionalized rubber, silica and sulfur containing organosilicon, and carbon black if used, are mixed in one or more non-productive mix stages. In any case, the sulfur vulcanizable rubber composition containing the silica coupling agent (such as a sulfur containing organosilicon compound), vulcanizable rubber, and generally at least part of the silica are subjected to a thermomechanical mixing step. The thermomechanical mixing step generally comprises a mechanical working in a mixer or extruder for a period of time suitable in order to produce a rubber temperature which is within the range of 140° C. to 190° C.

The appropriate duration of the thermomechanical working varies as a function of the operating conditions and the volume and nature of the components. For example, the thermomechanical working may be for a time duration which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It is normally more preferred for the rubber to reach a temperature which is within the range of about 155° C. to about 170° C. and to be maintained at said temperature for a period of time which is within the range of about 1 minute to about 10 minutes.

The thermomechanical working step adds time, labor, energy requirements, equipment requirements, and cost to the rubber formulating procedure. To eliminate the need for such a thermomechanical working step pre-hydrophobated precipitated silica was developed. For instance, U.S. Pat. No. 7,687,107 describes a process for producing a chemically modified siliceous filler by contacting an acidic aqueous suspension of amorphous precipitated silica with a coupling agent to form an acidic aqueous suspension of chemically modified precipitated silica, optionally in the presence of a surfactant and/or a water miscible solvent, and recovering said chemically modified filler, which comprises: (A) providing an acidic aqueous suspension of amorphous precipitated silica having a pH of 2.5 or less; (B) contacting the precipitated silica with a coupling agent comprising a combination of: (a) bis(alkoxysilylalkyl)polysulfide and (b) non-sulfur organometallic compound(s), the weight ratio of (a) to (b) being at least 0.05:1, under conditions that result in essentially complete hydrolysis of any alkoxy groups associated with the coupling agent, thereby to produce chemically modified precipitated silica; (C) raising the pH of the acidic aqueous suspension of chemically modified precipitated silica to from 3.0 to 10 with acid neutralizing agent that does not adversely affect the chemically modified precipitated silica; and (D) separating chemically modified precipitated silica from the aqueous phase while retaining in the aqueous phase substantially all of any alcohol byproduct produced by hydrolysis of alkoxy groups associated with the coupling agent, said chemically modified precipitated silica having (i) a carbon content of greater than 1 weight percent, (ii) a sulfur content of greater than 0.1 weight percent, (iii) a Silane Conversion Index of at least 0.3, and (iv) a Standard Tensile Stress at 300 percent elongation of at least 7.0 when incorporated into a vulcanized rubber composition. U.S. Pat. No. 7,704,552 describes a similar technique.

Pre-hydrophobated precipitated silica is commercially available from PPG Industries and is sold as Agilon® 400 performance silica. It is characterized by a CTAB surface area of 140 m²/g, a $N_2$ (BET-5) surface area of 75 m²/g, a SH weight of 0.5%, a carbon weight of 4.0%, a pH of 5.6, and a micro-granule physical form. Agilon® 400 also contains sodium sulfate ($Na_2SO_4$) as a residual salt.

The silica used as a reinforcing filler in rubber formulations can come from a wide variety of sources. For instance, agricultural products create waste materials such as rice hulls, rice straw, wheat chaff, and straw that are relatively high in siliceous content. These waste materials are useful industrially for numerous applications if their carbon content is removed to produce an ash which is comprised of predominantly amorphous silica which contains less than 3% carbon. Rice hulls are an example of such waste materials that can be treated to produce amorphous silica having a low carbon contain. Accordingly, the use of rice hull ash silica in rubber formulation is desirable because it make good use of a valueless waste material. United States Patent Application Publication Number 2002/0081247 describes method of making amorphous silica ash from waste materials including rice hull. This method includes the steps of: feeding exothermic siliceous material into a mixing zone for eventual discharge through an ash outlet; creating a gas stream consisting of inner and outer vortices about a common axis and containing sufficient oxygen for exothermic combustion of the feed material, the vortices meeting in the mixing zone to carry the feed material axially in the inner vortex with a centrifugal force component to cause the material to move outwardly from the inner vortex into the outer vortex so that the material is entrapped in the gas stream and passed repeatedly through the mixing zone until the feed material is converted primarily to amorphous silica ash having escape criteria needed to remain in the inner vortex to carry the ash to ash outlet for passage through the ash outlet; collecting spent gas at a spent gas outlet; monitoring the temperatures in the gas stream; comparing the temperatures in the gas stream with known information to provide an output signal; and using the output signal to control the maximum temperatures in the gas stream to result in a predominantly amorphous silica ash. U.S. Pat. No. 7,585,481 describes a similar process for producing amorphous silica ash from rice hull ash.

Other techniques can also be used in making pre-hydrophobated precipitated silica on a commercial basis. In most cases this involves a three step process. The first step is a precipitation step wherein sodium silicate solution (water glass) is reacted to produce a slurry of amorphous silica particles. In most cases the silica coupling agent is added during or immediately after the precipitation step. At this point the concentration of silica is about 5 to 6 weight percent. Then the treated precipitated silica slurry is concentrated into a filter cake. As the final step of the process the silica filter cake is dried, typically by spray drying, which affects the final filler morphology and brings the product moisture content to the desired level.

There is a continuing need for better silica coupling agents and for improved techniques for coupling silica to attain enhanced rubber performance characteristics. However, it is important for such coupling agents and techniques to be cost effective and to be capable of being implemented using standard procedures and conventional equipment. Additionally, it is important for such agents and techniques to not have an adverse environmental impact as compared to the use of conventional coupling agents.

SUMMARY OF THE INVENTION

The subject invention is based upon the unexpected discovery that the use of a very specific combination of hydrophobating silanes and sulfur crosslinkable silanes can be used to attain outstanding performance characteristics in silica reinforced rubber formulations. More specifically, these rubber formulations provide a highly desirable combination of both improved abrasion characteristics and reduced hysteresis without compromising other important rubber characteristics. In any case, the rubber formulations of this invention are made utilizing 2 phf to 12 phf of a hydrophobating silane, and 0.5 phf to 3 phf of a crosslinkable silane. At least about 0.5 phf and preferably at least about 1 phf of the crosslinkable silane is needed to attain a significant improvement in hysteresis and abrasion characteristics. However, further improvements are not realized by utilizing higher levels of the crosslinkable silane. In fact, the use of levels of the hydrophobating silane which are greater than about 3 phf can be detrimental to hysteresis and tensile properties. By the same token, at least about 2 phf, preferably at least 4 phf, and most at least preferably 6 phf of the hydrophobating silane is required to realize desired levels of improvement in processing characteristics. However, further improvements in processing characteristics are not achieved by utilizing level of the hydrophobating silane which are in excess of 12 phf.

The weight ratio of hydrophobating silanes to sulfur crosslinkable silanes will typically be within the range of 2:1 to 20:1 and will most preferably be within the range of 3.5:1 to 9:1. The total level of silica coupling agents (both hydrophobating silanes and sulfur crosslinkable silanes) will typically be within the range of 2.5 phf to 15 phf and will most preferably be within the range of 5 phf to 10 phf. In any case, the maximum level of sulfur crosslinkable silanes employed is 3 phf, preferably 2.8 phf, and most preferably about 2.6 phf. The silanes can be incorporated into the rubber formulation by standard thermomechanical working into the rubber formulation or by the use of a pre-hydrophobated precipitated silica which is made with both a hydrophobating silane and a sulfur crosslinkable silane.

The subject invention more specifically discloses a sulfur cured rubber formulation which is the reaction product of (1) at least one rubbery polymer, (2) sulfur, (3) silica, (4) 2 phf to 12 phf of a hydrophobating silane, and (5) 0.5 phf to 3 phf of a crosslinkable silane. The weight ratio of the hydrophobating silane to the crosslinkable silane will typically be within the range of about 2:1 to about 20:1, and the total weight of the hydrophobating silane and the crosslinkable silane will typically be within the range of 2.5 phf to 15 phf.

The present invention also specifically reveals a rubber formulation which is comprised of (1) at least one rubbery polymer, (2) silica, (3) a hydrophobating silane, and (4) a crosslinkable silane, wherein the weight ratio of the hydrophobating silane to the crosslinkable silane is within the range of about 2:1 to about 20:1, wherein the total weight of the hydrophobating silane and the crosslinkable silane is within the range of 2.5 phf to 15 phf and wherein the maximum level of the crosslinkable silane is 3 phf.

The present invention further reveals a sulfur cured rubber formulation which is the reaction product of (1) at least one rubbery polymer, (2) sulfur, (3) silica, (4) a hydrophobating silane, and (5) a crosslinkable silane, wherein the weight ratio of the hydrophobating silane to the crosslinkable silane is within the range of about 2:1 to about 20:1, wherein the total weight of the hydrophobating silane and the crosslinkable silane is within the range of 2.5 phf to 15 phf, and wherein the maximum level of the crosslinkable silane is 3 phf.

The subject invention also discloses a sulfur curable rubber formulation which is comprised of (1) at least one rubbery polymer, (2) sulfur, (3) silica, (4) 2 phf to 12 phf of a hydrophobating silane, and (5) 0.5 phf to 5 phf of a crosslinkable silane. The weight ratio of the hydrophobating silane to the crosslinkable silane will typically be within the range of about 2:1 to about 20:1, and the total weight of the hydrophobating silane and the crosslinkable silane will typically be within the range of 2.5 phf to 15 phf.

The subject invention also describes a tire which is comprised of a generally toroidal-shaped carcass with an outer circumferential tread which is adapted to be ground contacting, two spaced beads, at least one ply extending from bead to bead and sidewalls extending radially from and connecting said tread to said beads, wherein the circumferential tread is comprised of a sulfur cured rubber formulation which is the reaction product of (1) at least one rubbery polymer, (2) sulfur, (3) silica, (4) a hydrophobating silane, and (5) a crosslinkable silane, wherein the weight ratio of the hydrophobating silane to the crosslinkable silane is within the range of about 2:1 to about 20:1, wherein the total weight of the hydrophobating silane and the crosslinkable silane is within the range of 5 phr to 18 phr, and wherein the maximum level of the crosslinkable silane is 3 phr.

BRIEF DESCRIPTION OF THE DRAWINGS

FIG. 1 illustrates that increasing levels of MPTES can decrease hysteresis and the increasing levels of OTES do not have a significant effect on hysteresis. Results are shown for silica loadings of 60, 90 and 120 phr.

FIG. 2 shows that increasing levels of MPTES can improve abrasion characteristics and the increasing levels of OTES do not have a significant effect on abrasion characteristics.

FIG. 3 shows that increasing levels of MPTES can decrease elongation at break and the increasing levels of OTES do not have a significant effect on elongation at break.

FIG. 4 shows that increasing levels of MPTES can increase uncured viscosity and the increasing levels of OTES reduce the uncured viscosity of the rubber formulation.

DETAILED DESCRIPTION OF THE INVENTION

A wide variety of sulfur curable rubbery polymers can be used in making the rubber formulations of this invention. Non-limiting examples of such rubbers can include but are not limited to natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation, such as styrene and its derivatives, vinylpyridine and its derivatives, acrylonitrile, isobutylene and alkyl-substituted acrylates such as methylmethacrylate. Further non-limiting examples can include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in U.S. Pat. Nos. 4,530,959; 4,616,065; 4,748,199; 4,866,131; 4,894,420; 4,925,894; 5,082,901; and 5,162,409.

Various commercially available silicas may be considered for use in the practice of this invention. Some representative examples of silica that can be used in the practice of this invention includes, but is not limited to, silicas commercially available from PPG Industries under the Hi-Sil trademark, such as Hi-Sil® 210, Hi-Sil® 233 and Hi-Sil® 243, silicas available from Solvay, with, for example, designations of Zeosil®1085Gr, Zeosil®1115MP, Zeosil®1165MP, Zeosil® Premium and ZHRS®1200MP, and silicas available from Evonik Industries with, for example, designations Ultrasil® 5000GR, Ultrasil® 7000GR, Ultrasil® VN2, Ultrasil® VN3, and BV9000GR, and silicas available from Huber Engineered Materials with, for example, designations of Zeopol® 8745, and Zeopol® 8755LS. The silica will typically be included in the rubber formulations of this invention at a level which is within the range of about 20 phr to about 150 phr. The silica with preferably be included in the rubber formulations of this invention at a level which is within the range of 40 phr to 120 phr and will more preferably be included at a level which is within the range of 50 phr to 90 phr It is preferred for the silica to be rice hull ash silica. Such rice hull ash silica can be made in accordance with the teachings of United States Patent Application Publication Number 2002/0081247 A1 or U.S. Pat. No. 7,585,481 B2. The teachings of United States Patent Application Publication Number 2002/0081247 A1 and U.S. Pat. No. 7,585,481 B2 are incorporated herein by reference for the purpose of disclosing methods for making rice hull ash silica that can be utilized in accordance with this invention.

The crosslinkable silica coupling agent used in the practice of this invention will typically be a sulfur containing compound of the formula:

Z-Alk-S$_n$-Alk-Z                          (I)

Z-Alk-S$_n$-Alk                           (II)

Z-Alk-SH                               (III)

in which Z is selected from the group consisting of:

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication Number WO 2006/076670.

Specific examples of sulfur containing organosilicon compounds which may be used as the silica coupling agent in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide, (3-mercaptopropyl)trimethoxysilane, (3-mercaptopropyl)triethoxysilane, and 3-(triethoxysilyl)propyl thiooctanoate.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore, with respect to formula I, Z is preferably wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

Some preferred sulfur containing crosslinkable silanes are of the structural formula:

wherein n represents an integer from 1 to 6 and wherein m represents an integer from 0 to 6. It is preferred for n to be an integer from 1 to 4 and is more preferred from n to be the integer 1, 2, or 3. It is preferred for m to be an integer from 1 to 5 and is more preferred for n to represent the integer 1, 2, 3, 4, or 5. For example, it is preferred for the sulfur containing crosslinkable silane to be of the structural formula:

(MPTES)

The hydrophobating silanes that can be used as silica coupling agents in accordance with this invention are typically of the formula:

Z-Alk (IV)

$Si(OR^1)_4$ (V)

wherein Z is selected from the group consisting of:

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8.

Non-limiting examples of suitable organosilicon compounds that can be used as the hydrophobating silica coupling agent include, but are not limited to, compounds and mixtures of compounds selected from diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, trimethylmethoxysilane, trimethylethoxysilane, methyltrichlorosilane, methyltrimethoxysilane, methyltriethoxysilane, hexamethyldisiloxane, hexenylmethyldichlorosilane, hexenyldimethylchlorosilane, dimethylchlorosilane, dimethyldichlorosilane, dimethyldimethoxysilane, dimethyldiethoxysilane, hexamethyldisilazane, trivinyltrimethylcyclotrisilazane, polydimethylsiloxanes comprising 3 to about 20 dimethylsiloxy units and trimethylsiloxy or hydroxydimethylsiloxy end blocked poly(dimethylsiloxane) polymers having an apparent viscosity within the range of from 1 to 1000 in mPas at 25° C.

In one embodiment of this invention certain organotitanium compounds can be utilized as the hydrophobating silica coupling agent. Non-limiting examples of suitable organotitanium compounds can include, but are not limited to, tetra($C_1$-$C_{18}$)alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, [Ti($CH_2Ph$)$_3$($NC_5H_{10}$)] and [Ti($CH_2SiMe_3$)$_2$($NEt_2$)$_2$].

In another embodiment of this invention certain organozirconium compounds can be utilized as the hydrophobating silica coupling agent. Non-limiting examples of suitable organozirconium compounds that can include, but are not limited to, tetra($C_1$-$C_{18}$)alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, chlorotripentyl zirconium (iv). In alternate non-limiting embodiments, zirconium compounds similar to those described above for the organotitanium compounds and vice-versa are also contemplated.

Some preferred hydrophobating silica coupling agents for use in the practice of this invention are of the structural formula:

$$CH_3-(CH_2)_n-Si-[O-(CH_2)_mCH_3)]_3$$

wherein n represents an integer from 0 to 18 and wherein m represents an integer from 0 to 12. It is preferred for m to be an integer from 1 to 4 and is more preferred from m to be the integer 1, 2, or 3. It is preferred for n to be an integer from 4 to 10 and is more preferred for n to represent the integer 5, 6, 7, 8, or 9. For example, a highly preferred hydrophobating silica coupling agent is of the structural formula:

$$CH_3-(CH_2)_7-Si-(OCH_2CH_3)_3 \qquad (OTES)$$

The total level of the silica coupling agents (both hydrophobating silanes and sulfur crosslinkable silanes) which are incorporated into the rubber formulation will typically be within the range of 2.5 phf to 15 phf and will more typically be within the range of 6 phf to 15 phf. The total level of the silica coupling agents which are incorporated into the rubber formulation will preferably be within the range of 7 phf to 12 phf and will more preferably be within the range of 8 phf to 10 phf. In any case, the maximum level of sulfur crosslinkable silanes employed is 3 phf with the maximum level of crosslinkable silanes normally being 2.5 phf. In many cases the maximum level of crosslinkable silanes will be 2 phf, and in some cases the maximum level of crosslinkable silanes will be about 1.5 phf. It is normally preferred for the level of sulfur crosslinkable silanes utilized to be within the range of about 1 phf to 2.5 phf. In any case the level of crosslinkable silanes will be within the range of about 0.5 phf to 1.5 phf, 0.8 phf to 2.5 phf, or 1.5 phf to 3 phf.

In the rubber formulations of this invention, the weight ratio of the hydrophobating silanes to sulfur crosslinkable silanes will typically be within the range of 2:1 to 20:1 and will more typically within the range of 3:1 to 15:1. The weight ratio of the hydrophobating silanes to sulfur crosslinkable silanes will normally be within the range of 4:1 to 14:1 and is generally within the range of 5:1 to 12:1. The weight ratio of the hydrophobating silanes to sulfur crosslinkable silanes will preferably be within the range of 6:1 to 10:1 and will more preferably be within the range of 7:1 to 9:1.

The rubber formulations of this invention can contain filler in addition to the silica filler. In fact, such rubber formulations typically contain carbon black in addition to the silica filler. Commonly employed carbon blacks may be used as a conventional filler in an amount ranging from 2 phr to 150 phr. The carbon blacks may have iodine absorptions ranging from 9 to 145 g/kg and DBP number ranging from 34 to 150 $cm^3$/100 g. Such types of carbon black are preferably characterized by an Iodine absorption ranging from 9 to 100 g/kg and a DBP number ranging from 34 to 140 $cm^3$/100 gram. Some representative examples of reinforcing type carbon blacks that can be employed in the rubber formulations of this invention include N326, N330, N332, N339, N343, N347, N351, N358, N375, N539, N550, N582, N650, N660, N683, N754, N762, N765, N774, and N787.

Other fillers may be used in the rubber composition including, but not limited to, particulate fillers including ultra high molecular weight polyethylene (UHMWPE), crosslinked particulate polymer gels, and plasticized starch composite filler. Such other fillers may be used in an amount ranging from 1 phr to 30 phr and will typically be used at a level which is within the range of 4 phr to 20 phr.

It may readily be understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. In many cases microcrystalline waxes are used. Typical amounts of peptizers comprise about 0.1 to about 1 phr. Typical peptizers may be, for example, pentachlorothiophenol and dibenzamidodiphenyl disulfide.

Accelerators may be used to control the time and/or temperature required for vulcanization and to improve the properties of the vulcanizate. A single accelerator system may be used, i.e., primary accelerator. The primary accelerator(s) may be used in total amounts ranging from about 0.5 phr to about 8 phr. Combinations of a primary and a secondary accelerator may be used with the secondary accelerator being used in smaller amounts, such as from about 0.05 to about 5 phr, in order to activate and to improve the properties of the vulcanizate. Combinations of these accelerators may be expected to produce a synergistic effect on the final properties and are somewhat better than those produced by use of either accelerator alone.

Some non-limiting examples of suitable accelerator compositions include: benzothiazoles such as: 2-mercaptobenzothiazole, zinc 2-mercaptobenzothiazole, 2,2'-dithiobisbenzothiazole, 2-morpholinothiobenzothiazole, 2-(4-morpholinothio)-benzothiazole, 2-(4-morpholinodithio)-benzothiazole, 2-(4-morpholinothio)-5-methylbenzothiazole, 2-(4-morpholinothio)-5- chlorobenzothiazole, 2-(2,6-dimethyl-4-morpholinothio)-benzothiazole, 2-(3,6-dimethyl-4-morpholinothio)-benzothiazole, 2,2'-dibenzothiazole disulfide, and 2-mercaptobenzothiazyl disulfide; benzothiazole sulfenamides such as: N-cyclohexyl-2-benzothiazole sulfenamide, N-tert-butyl-2-benzothiazole sulfenamide, N,N'-dicyclohexyl-2-benzothiazole sulfenamide, N,N-diisopropyl-2-benzothiazole sulfenamide, N,N-diethyl-2-benzothiazole sulfenamide, N-oxydiethylene-2-benzothiazole sulfenamide, and N-oxydiethylene thiocarbamyl-N-oxydiethylene sulfenamide; dithiocarbamates such as: bismuth dimethyldithiocarbamate, copper dimethyldithiocarbamate, cadmium diethyldithiocarbamate, lead diamyldithiocarbamate, lead dimethyldithiocarbamate, selenium diethyldithiocarbamate, selenium dimethyldithiocarbamate, tellurium diethyldithiocarbamate, zinc dimethyldithiocarbamate, zinc diethyldithiocarbamate, zinc diamyldithiocarbamate, zinc di-n-butyldithiocarbamate, zinc dimethylpentamethylenedithiocarbamate, piperidinium pentamethylene dithiocarbamate, 2-benzothiazyl-N,N-diethyl-dithiocarbamate, and dimethylammonium dimethyldithiocarbamate; thiomorpholines such as: 4,4'-dithiodimorpholine, 4-mercaptomorpholine, 4-mercapto-2,6-dimethylmorpholine, 44(4-morpholinylthio)thixomethyll morpholine, 2,6-dimethylmorpholine disulfide, methyl morpholine disulfide, propyl 2,6-dimethylmorpholine disulfide, alkyl morpholine disulfide, and phenyl morpholine disulfide; thioureas such as: trimethylthiourea, 1,3-diethylthiourea, 1,3-dibutylthiourea, N,N'-dibutylthiourea, dimethylethylthiourea, diphenylthiourea, and tetramethylthiourea; xanthates such as: sodium isopropylxanthate, zinc isopropylxanthate, and zinc dibutylxanthate; thiuramsulfides such as: tetramethylthiuram monosulfide, tetramethylthiuram disulfide, tetraethylthiuram disulfide, tetrabutylthiuram disulfide, tetrabenzylthiuram disulfide, dipentamethylenethiuram tetrasulfide, dimethyldiphenylthiuram disulfide, and dipentamethylenethiuram monosulfide; amines such as: cyclohexylethylamine, dibutylamine, acetaldehyde-aniline condensation products, heptaldehyde-aniline condensation products; and guanidines, such as: N,N'-diphenylguanidine, N,N'-di-o-tolylguanidine, orthotolylbiguanidine, N,N',N"-triphenylguandine, and blends of diarylguanidines.

In addition, delayed action accelerators may be used which are not affected by normal processing temperatures, but produce a satisfactory cure at ordinary vulcanization temperatures. Vulcanization retarders might also be used. Suitable types of accelerators that are typically employed include amines, disulfides, guanidines, thioureas, thiazoles, thiurams, sulfenamides, dithiocarbamates and xanthates.

The ingredients used in making the rubber formulations of this invention are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black, if used, are mixed in one or more non-productive mix stages. The sulfur-vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 1 minute to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The rubber formulations of this invention can be utilized in making a wide variety of rubber products, including tires, hoses, air springs, power transmission belts, conveyor belts, windshield wiper blades, bushings, and the like. These rubber formulations are of particular benefit when used in making tire tread compounds. Such tires can be pneumatic race tires, passenger tires, run-flat tires, aircraft tires, agricultural tires, earthmover tires, off-the-road tires, medium truck tires, or any other type of pneumatic or non-pneumatic tire. In one example, the tire is a passenger tire or a truck tire. The tire can also be a radial ply tire or a bias ply tire.

Vulcanization of the example pneumatic tire may generally be carried out at conventional temperatures ranging from about 100° C. to 200° C. Any of the usual vulcanization processes may be used such as heating in a press or mold and/or heating with superheated steam or hot air. Such tires can be built, shaped, molded and cured by various methods which are known and are readily apparent to those having skill in such art.

This invention is illustrated by the following examples which are merely for the purpose of illustration and are not to be regarded as limiting the scope of the invention or the manner in which it can be practiced. Unless specifically indicated otherwise, parts and percentages are given by weight.

Example 1

A series of rubber formulations which contained various levels of octyl silane (OTES) and mercaptopropyl silane (MPTES) were compounded, cured, and evaluated in this series of experiments. These rubber formulations were made by first making nonproductive compounds by mixing the following ingredients:

| Nonproductive Rubber Formulations | |
|---|---|
| Ingredients | Levels |
| Budene ® 1207 High Cis-1,4-Polybutadiene Rubber | 30 phr |
| Functionalized Styrene-Butadiene Rubber | 70 phr |
| N330 Carbon Black | 2 phr |
| Stearic Acid | 5 phr |
| Wax | 1.5 phr |
| Zeosil 1165 MP Reinforcing Silica | 60 phr, 90 phr, or 120 phr |
| Processing Oil | 21.5 phr, 32.5 phr, 43 phr |
| Hydrophobating Coupling Agent - OTES | |
| Crosslinkable Coupling Agent - MPTES | |
| α-Methylstyrene/Styrene Resin | 5 phr |
| Antioxidant | 3.25 phr |

Then, productive rubber formulations were made by mixing the following ingredients into the nonproductive rubber formulations:

| Additional Ingredients to Make Productive Rubber Formulations | |
|---|---|
| Ingredients | Levels |
| Zinc Oxide | 1.75 phr |
| Sulfur | 1.3 phr |
| CBS Accelerator | 2.25 phr |
| Diphenyl Guanidine | 2.5 phr |

Figure 1:
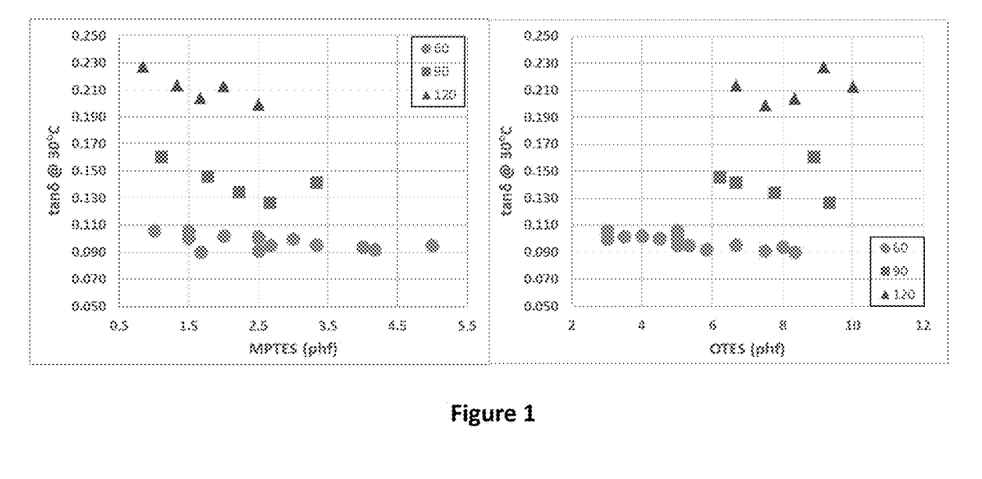
FIG. 1 includes a graph showing tan δ at 30° C. versus increasing levels of MPTES and a graph showing tan δ at 30° C. versus increasing levels of OTES in the rubber formulations described in Example 1.

The productive rubber formulations were then cured and tested to determine hysteresis, abrasion characteristics, elongation at break, and processing characteristics. These properties are reported in FIGS. 1-4. As can be seen from FIG. 1, in the case of the formulations that contained 90 phr and 120 of silica hysteresis decreased (as indicated by lower tan δ values at 30° C.) with increasing levels of MPTES up to a level of about 3.0 phf. At the 90 phr silica loading MPTES levels over about 3 phf may have even had an adverse effect on hysteresis. In any case, FIG. 1 shows that hysteresis decreased with increasing levels of MPTES at MPTES levels over the range of 1 phf to 3 phf at silica loadings of 90 phr to 120 phr. However, the OTES did not show a significant effect on hysteresis.

Figure 2:
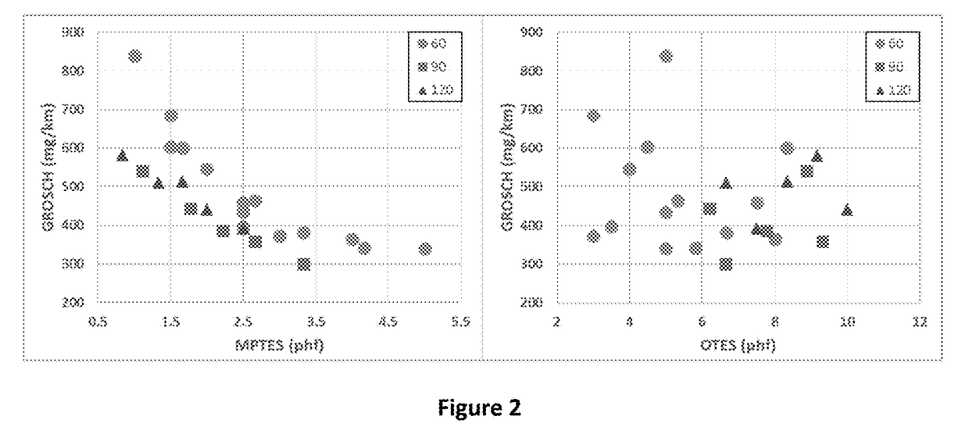
FIG. 2 includes a graph showing abrasion loss versus increasing levels of MPTES and a graph showing abrasion loss versus increasing levels of OTES in the rubber formulations described in Example 1.
Figure 3:
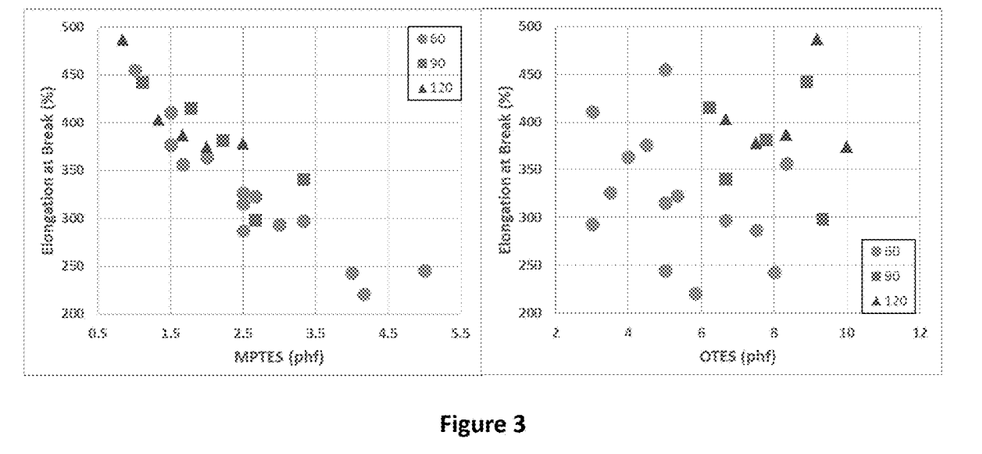
FIG. 3 includes a graph showing elongation at break versus increasing levels of MPTES and a graph showing elongation at break versus increasing levels of OTES in the rubber formulations described in Example 1.

FIG. 2 shows that increasing levels of MPTES decreased abrasion loss which is indicative of improved tread-wear when used in tire tread compounds. However, the OTES did not show a significant effect on the abrasion resistance of the rubber formulations. FIG. 3 shows that increasing levels of MPTES decreases the elongation at break of the rubber formulations and that the OTES had no significant effect on elongation at break.

Figure 4:
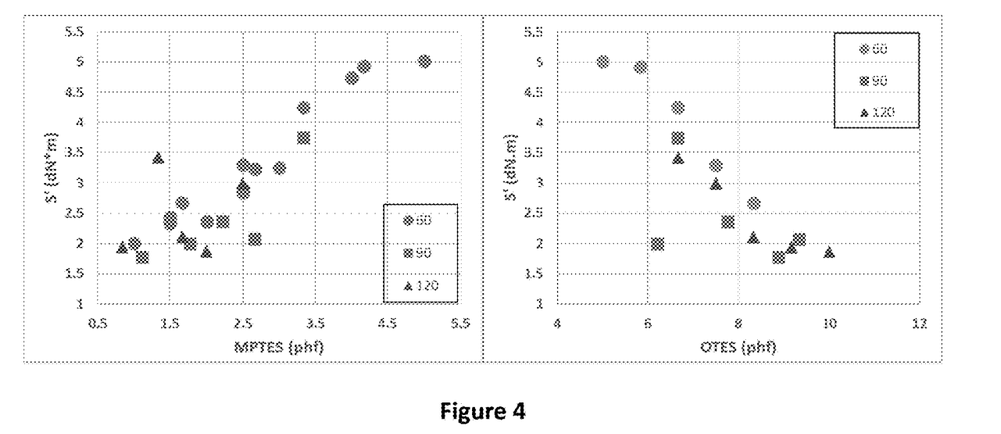
FIG. 4 includes a graph showing uncured viscosity versus increasing levels of MPTES and a graph showing uncured viscosity versus increasing levels of OTES in the rubber formulations described in Example 1.

FIG. 4 shows that increasing level of MPTES increased the uncured viscosity of the rubber formulations and that increasing levels of OTES decreased uncured viscosity. By utilizing a combination of MPTES and OTES at appropriate levels the rubber formulations of this invention having decreased hysteresis and improved abrasion resistance while maintaining processing characteristics can be made.

Comparative Example 2 and Examples 3 and 4

In this experiment two experimental silica reinforced rubber formulations were made and silica coupled with both a hydrophobating silane coupling agent (OTES) and a sulfur containing crosslinkable silane coupling agent (MPTES). These experimental samples were compared to a rubber formulation which was identical in composition other than being coupled with a conventional monosilane coupling agent (NXT* silane from Momentive). These formulations and their characterization are reported in Table 1.

TABLE 1

| | Comparative 2 | Example 3 | Example 4 |
|---|---|---|---|
| Coupling Agent | 9 phr NXT* Monosilane | 8 phr OTES + 1 phr MPTES | 7 phr OTES + 2 phr MPTES |
| T/E INSTRON | | | |
| 100% Modulus | 2.1 MPa | 1.8 MPa | 2.0 MPa |
| 300% Modulus | 8.6 MPa | 8.6 MPa | 10.5 MPa |
| Tensile Strength | 16.3 MPa | 17.1 MPa | 16.6 MPa |
| Elongation @ Break | 487% | 497% | 413% |
| ABRASION RESISTANCE RATING (Higher = Better) | | | |
| DIN | 100 | 115 | 77 |
| Grosch | 100 | 116 | 100 |

TABLE 1-continued

| | Comparative 2 | Example 3 | Example 4 |
|---|---|---|---|
| ZWICK REBOUND | | | |
| 0° C. | 23.6 | 25.3 | 27.0 |
| 23° C. | 43.4 | 48.8 | 52.6 |
| 60° C. | 58.2 | 62.7 | 66.1 |
| 100° C. | 66.5 | 70.9 | 72.9 |
| RPA | | | |
| G' @ 1%, 45° C., 10 Hz | 2.0 MPa | 1.6 MPa | 1.6 MPa |
| G' @ 10%, 45° C., 10 Hz | 1.4 MPa | 1.2 MPa | 1.3 MPa |
| tan δ 1%, 45° C., 10 Hz | 0.127 | 0.108 | 0.108 |
| tan δ 10%, 45° C., 10 Hz | 0.133 | 0.113 | 0.107 |
| ARES TEMP SWEEP | | | |
| tan δ @ 0° C. | 0.392 | 0.324 | 0.307 |
| tan δ @ 30° C. | 0.213 | 0.135 | 0.128 |
| G' @ -20° C. | $9.0 \times 10^6$ Pa | $6.5 \times 10^6$ Pa | $5.8 \times 10^6$ Pa |
| G' @ 30° C. | $2.5 \times 10^6$ Pa | $1.9 \times 10^6$ Pa | $1.7 \times 10^6$ Pa |

As can be seen from Table 1, the two experimental rubber formulations of this invention exhibited significantly reduced hysteresis (as indicated by lower tan δ values) than the rubber which was coupled only with the monosilane silica coupling agent (Momentive NXT* silane).

Additional rubber formulations were also made utilizing a higher level of coupling agents. The result of these experiments is reported in Table 2.

TABLE 2

| | Comparative 2 | Example 3 | Example 4 |
|---|---|---|---|
| Coupling Agent | 10.95 phr NXT Monosilane | 9.73 phr OTES + 1.22 phr MPTES | 8.52 phr OTES + 2.43 phr MPTES |
| T/E INSTRON | | | |
| 100% Modulus | 3.0 MPa | 2.7 MPa | 3.2 MPa |
| 300% Modulus | 13.3 MPa | 13.3 MPa | |
| Tensile Strength | 15.3 MPa | 15.8 MPa | 14.1 MPa |
| Elongation @ Break | 335% | 343% | 256% |
| ABRASION RESISTANCE RATING (Higher = Better) | | | |
| Abrasion Rating | 100 | 85 | 106 |
| ZWICK REBOUND | | | |
| 0° C. | 20.2 | 24.0 | 24.8 |
| 23° C. | 43.1 | 50.7 | 54.3 |
| 60° C. | 59.1 | 66.9 | 71.1 |
| 100° C. | 68.7 | 74.4 | 77.4 |
| RPA | | | |
| G' @ 1%, 45° C., 10 Hz | 2.3 MPa | 1.9 MPa | 2.1 MPa |
| G' @ 10%, 45° C., 10 Hz | 1.6 MPa | 1.4 MPa | 1.6 MPa |
| tan δ 1%, 45° C., 10 Hz | 0.126 | 0.089 | 0.087 |
| tan δ 10%, 45° C., 10 Hz | 0.124 | 0.095 | 0.095 |
| ARES TEMP SWEEP | | | |
| tan δ @ 0° C. | 0.381 | 0.337 | 0.345 |
| tan δ @ 30° C. | 0.188 | 0.139 | 0.134 |
| G' @ -20° C. | $1.3 \times 10^7$ Pa | $9.5 \times 10^6$ Pa | $1.0 \times 10^7$ Pa |
| G' @ 30° C. | $2.8 \times 10^6$ Pa | $2.1 \times 10^6$ Pa | $2.3 \times 10^6$ Pa |

As can be seen from Table 2, the two experimental rubber formulations of this invention exhibited a significantly reduced hysteresis (as indicated by lower tan δ values) than the rubber which was coupled only with the monosilane silica coupling agent (Momentive NXT* silane).

While certain representative embodiments and details have been shown for the purpose of illustrating the subject invention, it will be apparent to those skilled in this art that various changes and modifications can be made therein without departing from the scope of the subject invention.

What is claimed is:

1. A sulfur curable rubber formulation which is comprised of (1) at least one rubbery polymer, (2) sulfur, (3) 50 to 150 phr of pre-reacted silica, and (4) 2 phr to 10 phr of carbon black, wherein the pre-reacted silica is comprised of a silica which is pre-reacted with (a) a hydrophobating silane, and (b) a crosslinkable silane, wherein the crosslinkable silane is of the structural formula: HS—$(CH_2)_n$—Si—$[(O$—$(CH_2)_m CH_3)]_3$, wherein n represents an integer from 1 to 6, wherein m represents an integer from 0 to 6, wherein the weight ratio of the hydrophobating silane to the crosslinkable silane is within the range of about 2:1 to about 20:1, wherein the total weight of the hydrophobating silane and the crosslinkable silane is within the range of 2.5 phf to 15 phf, wherein the level of hydrophobating silica is within the range of 2 phf to 12 phf, wherein the level of the crosslinkable silane is within the range of 0.5 phf to 3 phf, and wherein the sulfur curable rubber formulation is void of titanium compounds.

2. The sulfur curable rubber formulation of claim 1 wherein the carbon black is present at a level which is within the range of 2 phr to 5 phr.

3. The sulfur curable rubber formulation of claim 1 wherein the weight ratio of hydrophobating silane to crosslinkable silane is within the range of 6:1 to 12:1.

4. The sulfur curable rubber formulation of claim 1 wherein total level of the hydrophobating silane and the crosslinkable silane is within the range of 8 phf to 10 phf.

5. The sulfur curable rubber formulation of claim 1 wherein the level of crosslinkable silane is within the range of 0.5 phf to 2.5 phf.

6. The sulfur curable rubber formulation of claim 1 wherein n represents the integer 3 and wherein m represents the integer 1.

7. The sulfur curable rubber formulation of claim 1 wherein the hydrophobating silica is of the structural formula:

$CH_3$—$(CH_2)_n$—Si—$[(O$—$(CH_2)_m CH_3)]_3$ wherein n represents an integer from 0 to 18 and wherein m represents an integer from 0 to 6.

8. The sulfur curable rubber formulation of claim 7 wherein n represents the integer 7 and wherein m represents the integer 1.

9. A sulfur cured rubber formulation which is the reaction product of sulfur and the sulfur curable rubber formulation of claim 1.

10. A tire which is comprised of a generally toroidal-shaped carcass with an outer circumferential tread which is adapted to be ground contacting, two spaced beads, at least one ply extending from bead to bead and sidewalls extending radially from and connecting said tread to said beads, wherein the circumferential tread is comprised of the sulfur cured rubber formulation of claim 9.

11. A pre-reacted silica which is comprised of a silica which is pre-reacted with (1) a hydrophobating silane, and (2) a crosslinkable silane, wherein the crosslinkable silane is of the structural formula: HS—$(CH_2)_n$—Si—$[(O$—$(CH_2)_m CH_3)]_3$, wherein n represents an integer from 1 to 6, wherein m represents an integer from 0 to 6, wherein the hydrophobating silica is of the structural formula: $CH_3$—$(CH_2)_x$—Si—$[(O$—$(CH_2)_y CH_3)]_3$, wherein x represents an integer from 0 to 18 and wherein y represents an integer from 0 to 6, wherein the weight ratio of the hydrophobating silane to the crosslinkable silane is within the range of about 2:1 to about 20:1, wherein the total weight of the hydrophobating silane and the crosslinkable silane is within the range of 2.5 phf to 15 phf, wherein the maximum level of the crosslinkable silane is 3 phf, and wherein the pre-reacted silica is void of titanium compounds.

12. The pre-reacted silica of claim 11 wherein the weight ratio of hydrophobating silane to the crosslinkable silane is within the range of 6:1 to 12:1.

13. A rubber formulation which is comprised of (1) at least one rubbery polymer, and (2) the pre-reacted silica as specified in claim 11.

14. The pre-reacted silica of claim 12 wherein x represents the integer 7 and wherein y represents the integer 1.

15. A sulfur curable rubber formulation which is comprised of (1) at least one rubbery polymer, (2) sulfur, (3) 50 to 150 phr of pre-reacted silica, and (4) 2 phr to 10 phr of carbon black, wherein the pre-reacted silica consists of a silica which is pre-reacted with (a) a hydrophobating silane, and (b) a crosslinkable silane, wherein the crosslinkable silane is of the structural formula: HS—$(CH_2)_n$—Si—$[(O$—$(CH_2)_m CH_3)]_3$, wherein n represents an integer from 1 to 6, wherein m represents an integer from 0 to 6, wherein the weight ratio of the hydrophobating silane to the crosslinkable silane is within the range of about 2:1 to about 20:1, wherein the total weight of the hydrophobating silane and the crosslinkable silane is within the range of 2.5 phf to 15 phf, wherein the level of hydrophobating silica is within the range of 2 phf to 12 phf, and wherein the level of the crosslinkable silane is within the range of 0.5 phf to 3 phf.

16. The sulfur curable rubber formulation of claim 15 wherein the carbon black is present at a level which is within the range of 2 phr to 5 phr and wherein the weight ratio of hydrophobating silane to crosslinkable silane is within the range of 6:1 to 12:1.

17. The sulfur curable rubber formulation of claim 15 wherein total level of the hydrophobating silane and the crosslinkable silane is within the range of 8 phf to 10 phf and wherein the level of crosslinkable silane is within the range of 0.5 phf to 2.5 phf.

18. The sulfur curable rubber formulation of claim 15 wherein n represents the integer 3 and wherein m represents the integer 1.

19. A sulfur cured rubber formulation which is the reaction product of sulfur and the sulfur curable rubber formulation of claim 15.

20. A tire which is comprised of a generally toroidal-shaped carcass with an outer circumferential tread which is adapted to be ground contacting, two spaced beads, at least one ply extending from bead to bead and sidewalls extending radially from and connecting said tread to said beads, wherein the circumferential tread is comprised of the sulfur cured rubber formulation of claim 19.

* * * * *